United States Patent [19]

Gordon

[11] 4,309,640
[45] Jan. 5, 1982

[54] CIRCUIT AND METHOD FOR CORRECTING SIDE PINCUSHION DISTORTION AND REGULATING PICTURE WIDTH

[75] Inventor: Samuel Y. Gordon, Tualatin, Oreg.

[73] Assignee: Tektronix, Inc., Beaverton, Oreg.

[21] Appl. No.: 115,523

[22] Filed: Jan. 25, 1980

[51] Int. Cl.³ .............................................. H01J 29/70
[52] U.S. Cl. .................................... 315/371; 315/389
[58] Field of Search ............ 315/371, 370 (U.S. only), 315/387, 389

[56] References Cited

U.S. PATENT DOCUMENTS

| | | | |
|---|---|---|---|
| 3,432,719 | 3/1969 | Strachanow | 315/370 |
| 3,649,870 | 3/1972 | Maulsby | 315/371 |
| 4,039,899 | 8/1977 | Battjes et al. | 315/371 |
| 4,129,807 | 12/1978 | Infante | 315/399 X |
| 4,184,104 | 1/1980 | Shouse, Jr. | 315/371 |
| 4,243,918 | 1/1981 | Meise | 315/389 |

Primary Examiner—Malcolm F. Hubler
Attorney, Agent, or Firm—Thomas J. Spence

[57] ABSTRACT

A circuit within a cathode-ray tube electromagnetic deflection system for correcting side pincushion distortion and regulating picture width independent of changes in the video line rate. The circuit employs a predistorted AC reference signal and a second DC reference signal in a closed-loop manner to cause a deflection current to describe precisely an ideal waveform defining simultaneously both pincushion correction and picture width regulation.

10 Claims, 4 Drawing Figures

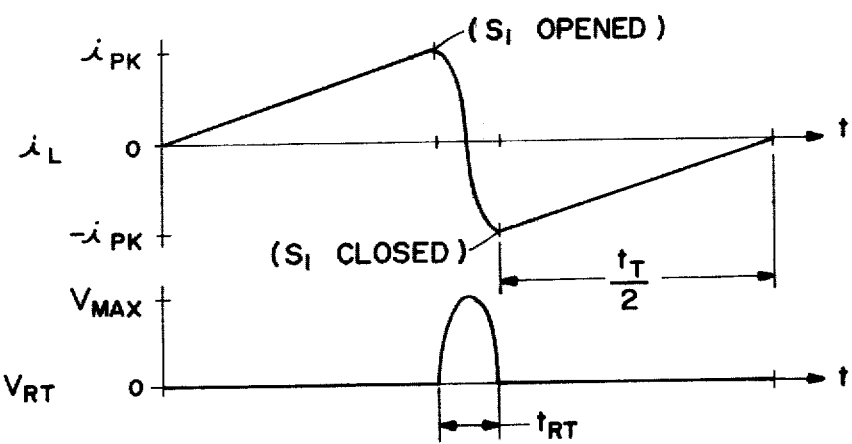
_Fig 2._
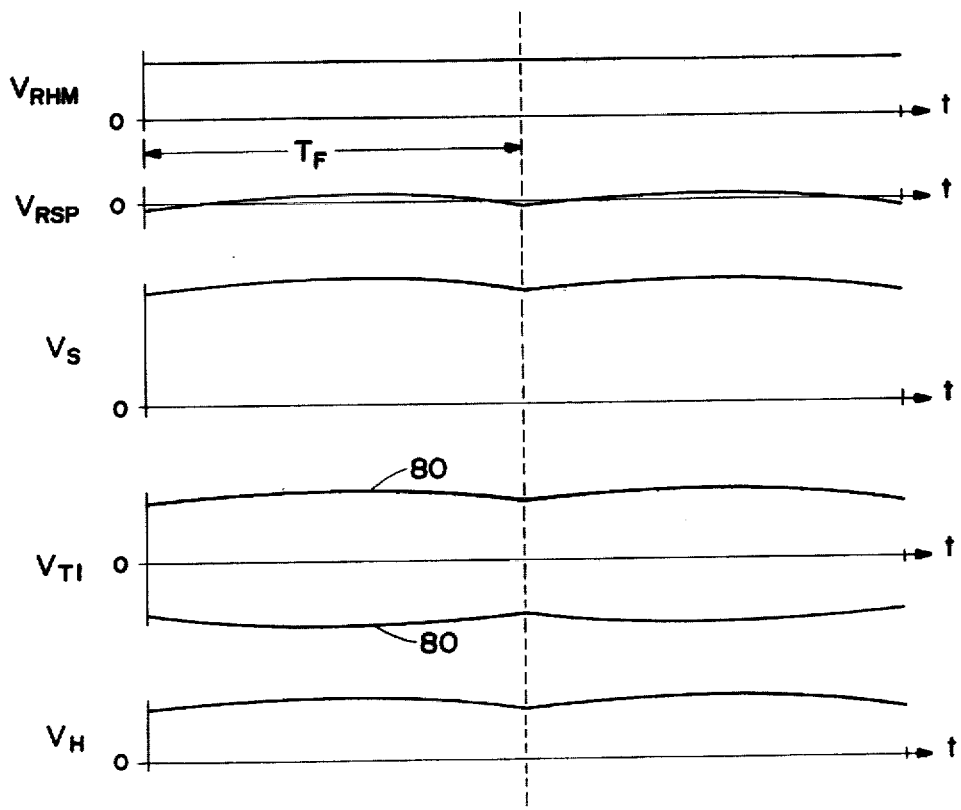
_Fig 4._

CIRCUIT AND METHOD FOR CORRECTING SIDE PINCUSHION DISTORTION AND REGULATING PICTURE WIDTH

BACKGROUND OF THE INVENTION

The subject matter of the present invention pertains to means within a cathode-ray tube electromagnetic deflection system for correcting side pincushion distortion and regulating picture width.

As is known to the art, side pincushion distortion in a cathode-ray tube display system is caused by the development of an image on a display screen having a radius of curvature greater than the minimum distance between the screen and the point of deflection of the beam used to describe the image. Such distortion is characterized by a widening of the image in the horizontal direction at the top and bottom relative to the center. A comprehensive discussion of the pincushion effect may be found in A. E. Popodi, "Linearity Correction For Magnetically Deflected Cathode-Ray Tubes," EDN Magazine, January 1964, pages 124–139.

The most common method for correcting side pincushion distortion is to modulate the horizontal deflection signal with a correction signal varying at the vertical deflection rate. In the typical case, a correction signal is generated according to a predetermined mathematical analysis of the geometries involved and then employed to predistort the horizontal deflection signal before it is applied to the deflection system of the cathode-ray tube. A pertinent example of such a known pincushion correction circuit is that disclosed by Battjes et al U.S. Pat. No. 4,039,899, assigned to the assignee of the present invention. Other pertinent examples include those disclosed by Balaban et al U.S. Pat. No. 4,132,927, Deitz U.S. Pat. No. 3,962,602, Worster et al. U.S. Pat. No. 3,916,254, Bellow U.S. Pat. No. 3,825,796, Chapman U.S. Pat. No. 3,781,590, Schwartz, U.S. Pat. No. 3,772,566 and Williams U.S. Pat. No. 3,517,252.

A common disadvantage of known systems for correcting pincushion distortion is their open loop configuration. After the correction signal has been generated and employed to predistort the horizontal deflection signal, the distorted signal is applied directly to the deflection system of the cathode-ray tube. There is no provision for sampling the actual signal produced within the deflection system to be sure that it follows the signal supplied. Such a provision is especially desirable in an environment of modern digital display systems where the requirements for accuracy and resolution are especially high.

Somewhat associated with the problem of pincushion distortion is the ofttimes attendant problem of maintaining a desired picture width independent of changes in the video line rate. Historically, each time a change occurs in the line rate, the image width changes as well and a manual adjustment is necessary to return it to its original dimension. Although previous attempts, most pertinently that disclosed by Infante U.S. Pat. No. 4,129,807, have been made to regulate picture width independent of changes in the rate, none of those attempts have as yet been completely successful. Moreover, no known means has been developed to accomplish simultaneously both side pincushion correction and picture width regulation via the same closed loop circuit.

SUMMARY OF THE INVENTION

The present invention is directed to a circuit and method within a cathode-ray tube electromagnetic deflection system for providing side pincushion correction and picture width regulation independent of changes in the video line rate. More particularly, the circuit of the present invention comprises means for producing a deflection current through the yoke inductance of the electromagnetic deflection system, means for receiving a previously generated pincushion an picture width correction signal, and means including a feedback loop responsive to the deflection current for causing the amplitude and average peak value of the current to follow that of the correction signal. Provision is made for dividing a feedback signal into its pertinent AC and DC components so as to permit simultaneous correction of side pincushion distrortion and regulation of picture width. A principal feature of the present invention is that such correction and regulation are accomplished independent of changes in the video line rate.

It is, therefore, a principal objective of the present invention to provide a circuit of the type described for correcting side pincushion distortion and regulating picture width independent of changes in the video line rate.

It is an additional principal objective of the present invention to provide a method of accomplishing such pincushion correction and picture width regulation independent of changes in the video line rate.

It is an advantage of the circuit of the present invention that such correction and regulation are accomplished simultaneously in a single closed loop circuit.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 2 is a diagrammatic representation of a voltage and current waveform present within the circuit of FIG. 1 during its operation.

FIG. 3 is a simplified schematic representation of an exemplary embodiment of the deflection circuit of the present invention.

FIG. 4 is a diagrammatic representation of a series of voltage and current waveforms present within the circuit of FIG. 3 during its operation.

DETAILED DESCRIPTION OF THE PREFERRED EMBODIMENT

Figure 1:
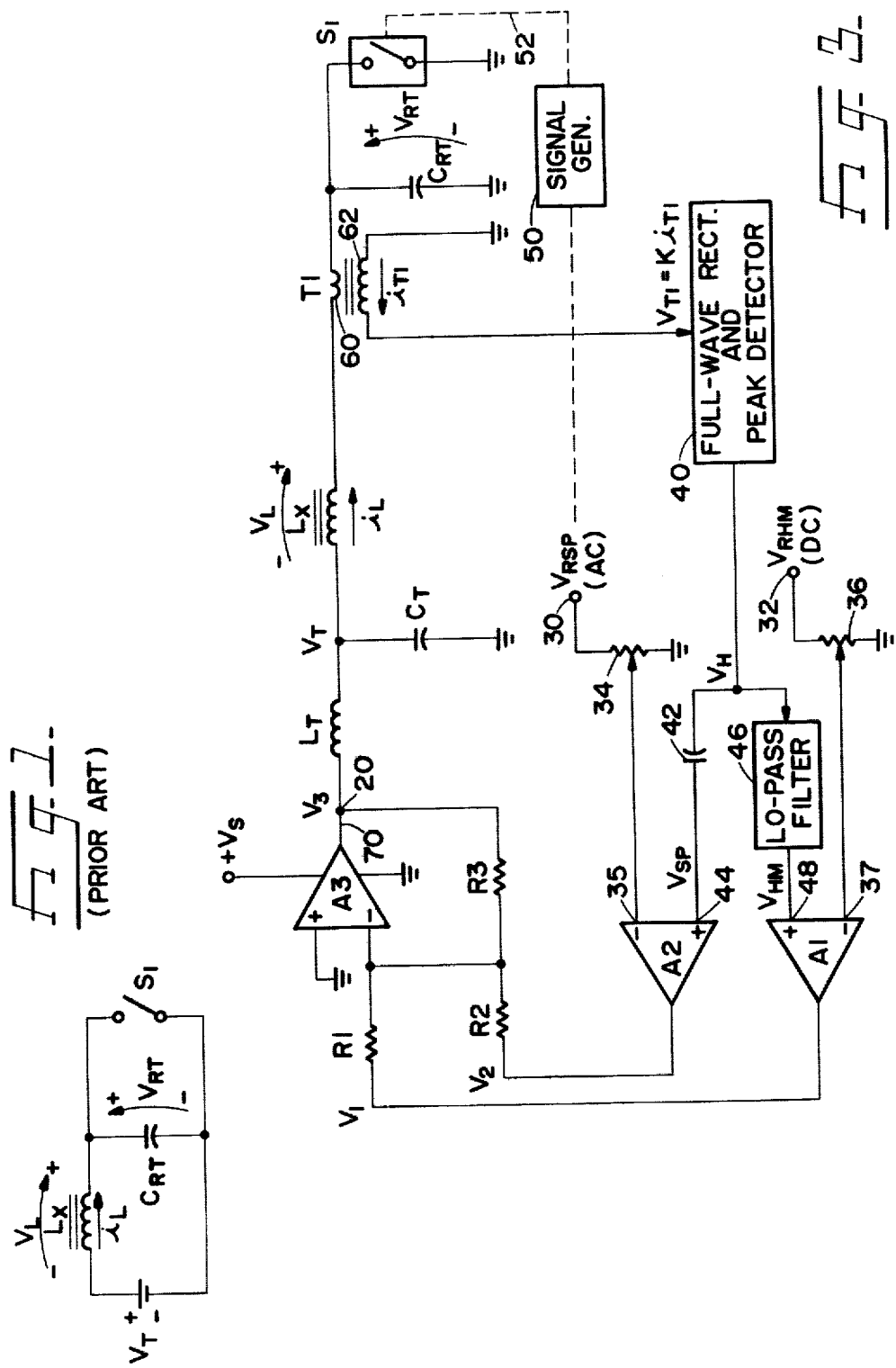
FIG. 1 is a simplified schematic representation of a basic prior art deflection circuit.

Referring briefly to FIG. 1 of the drawings, there is disclosed in simplified form a well-known basic prior art circuit for producing a ramp current through an inductance. As disclosed, the circuit includes a source $V_T$ of DC potential connected in series with an inductance $L_X$ and in parallel with a capacitance $C_{RT}$ and a switch $S_1$. For purposes of this specification the inductance $L_X$ is assumed to be the yoke inductance of a cathode-ray tube electromagnetic deflection system; however, it may more generally be any inductance through which a controlled current is to be produced. As is known to the art, when the switch $S_1$ is closed, the current $i_L$ through the inductance $L_X$ is defined by $di_L/dt = V_T/L_X$, and when switch $S_1$ is opened, the current is defined by $i_L = i_{pk} \cos(t/\sqrt{L_X C_{RT}}) + V_T \sqrt{C_{RT}/L_X} \sin(t/\sqrt{L_X C_{RT}})$, where $i_{pk}$ is the peak current attained before the switch is opened. When the switch is operated cyclically at a given rate with a closed time of $t_T$ and an open time of approximately $\pi \sqrt{L_X C_{RT}}$, the current $i_L$ defines the conventional deflection current shown in the upper curve of FIG. 2. If $i_L$ is assumed to start at approximately $-i_{pk}$ when the switch $S_1$ is closed and reaches $+i_{pk}$ when the switch is opened, then $i_{pk} = V_T t_T / 2L_X$. The lower curve of FIG. 2 represents the corresponding voltage $V_{RT}$ developed across the capacitance $C_{RT}$. In a raster scan horizontal deflection environment, $t_T$ is the trace or forward scan time, and $t_{RT}$ is the retrace or reverse scan time, and the difference between $+i_{pk}$ and $-i_{pk}$, or $2i_{pk}$, defines the image, or picture, width.

Referring now to FIG. 3, there is disclosed an exemplary embodiment of the side pincushion correction and picture width regulation circuit according to the present invention. It will be noted first that the circuit of FIG. 3 includes an inductance, capacitance, and switch interconnected substantially as indicated in FIG. 1. For ease of understanding, these three components are given the same labels, that is $L_X$, $C_{RT}$, and $S_1$, respectively, in both figures. Other components appearing in the circuit of FIG. 3 include a source, defined temporarily as point 20, of positive voltage $V_3$, and a trace filter inductor $L_T$ and capacitor $C_T$. Disregarding the remainder of the circuit, the components identified thus far operate in a conventional known manner to produce in the inductance $L_X$ a sawtooth deflection current similar to that described earlier and shown in the upper curve of FIG. 2.

Also included in the circuit of FIG. 3 are an input terminal 30 for receiving an AC side pincushion reference signal $V_{RSP}$, a second input terminal 32 for receiving a DC horizontal magnitude reference signal $V_{RHM}$, a current-sensing transformer $T_1$ connected between the inductance $L_X$ and the capacitance $C_{RT}$, a full-wave rectifier and peak detector 40 for processing the signal sensed by the transformer $T_1$, a difference amplifier A1 for comparing the DC component $V_{HM}$ of the signal produced by the rectifier/detector 40 with the reference signal $V_{RHM}$, a second difference amplifier A2 for comparing the AC component $V_{SP}$ of the rectifier/detector signal with the reference voltage $V_{RSP}$, and a third amplifier A3 for varying the magnitude of a supply voltage $V_S$ in response to signals received from the two amplifiers A1 and A2. As will be recognized, the components last mentioned form a feedback loop for controlling or amplitude modulating the voltage $V_3$ at point 20 in accordance with the reference signals $V_{RSP}$ and $V_{RHM}$.

The reference signal may be derived from signals produced by known pincushion correction circuits; for example, the circuit disclosed by Battjes et al. U.S. Pat. No. 4,039,899 cited in an earlier section of this specification. Such a circuit is assumed to be included in the signal generator 50 of FIG. 2 along with suitable circuitry for providing a timing signal, indicated by the dotted line 52, to drive the switch $S_1$ at a predetermined rate in synchrony with the reference signals. The reference signal $V_{RHM}$ may be obtained from any suitable source of DC potential.

As disclosed in the Battjes et al. reference, the Battjes circuit produces, among other signals, a corrected reference voltage $E_F$ having a DC component, a first AC component varying at the horizontal deflection rate, and a second AC component varying at the slower vertical deflection rate. In a conventional television environment, the horizontal deflection rate is 15,750 Hz and the vertical rate is 60 Hz, but other rates may be used in the more broad field of information display products. For purposes of this disclosure, the conventional television rate will be assumed.

In the circuit of FIG. 3, the vertical component of the voltage $E_F$ is defined as the correction signal $V_{RSP}$. This signal and the DC reference signal $V_{RHM}$ are represented diagrammatically as the fist two waveforms of FIG. 4 and describe precisely the waveforms required to effect the desired side pincushion correction and picture width regulation. The period $T_F$ of the signal $V_{RSP}$ is the reciprocal of the vertical deflection or field rate and, for a conventional 525-line interlaced raster scan image, is $262\frac{1}{2}$ times the period of the horizontal deflection signal. It should be understood that the Battjes et al circuit itself forms no part of the present invention and the correction signal $V_{RSP}$ of FIG. 4 may be obtained from any suitable source without departing from the invention is disclosed.

For use in the circuit of FIG. 3, a preselected portion of the signal $V_{RSP}$ is applied via a potentiometer 34 to the negative input terminal 35 of the difference amplifier A2 and a similar preselected portion of the signal $V_{RHM}$ is applied via a second potentiometer 36 to the negative input terminal 37 of the difference amplifier A1. The two potentiometers permit initial adjustment of the pincushion correction and picture width to desired values.

As alluded to earlier, if the point 20 is disconnected from the output terminal of the amplifier A3 and connected to a source of DC potential $V_3$, and the switch $S_1$ is operated in the cyclical manner suggested, a current $i_L$ will be produced through the inductance $L_X$ essentially as presented by the upper waveform of FIG. 2. If the switch $S_1$ is operated at the horizontal deflection rate, $262\frac{1}{2}$ cycles of the $i_L$ waveform will occur during the period $T_F$ of the corresponding vertical deflection signal. As the current $i_L$ also flows through the primary winding 60 of the sensing transformer T1, a corresponding current $i_{T1}$ is induced into the secondary winding 62 for application as a feedback voltage signal $V_{T1} = K i_{T1}$ to the full-wave rectifier and peak detector 40. Rectifier/detector 40 may be of any conventional design capable of performing precise rectification and peak detection of an input voltage signal of the type described.

Assuming still that the point 20 remains connected to a source of DC potential $V_3$, the signal $V_{T1}$ will vary at the horizontal deflection rate only and the output signal $V_H$ from the rectifier/detector 40 will be a constant positive voltage. The AC component $V_{SP}$ (in this case, zero) of the signal $V_H$ is applied via a coupling capacitor 42 to the positive input terminal 44 of the difference amplifier A2 and the DC component $V_{HM}$ is applied via a low-pass filter 46 to the positive input terminal 48 of the difference amplifier A1. The resultant difference signals $V_1$ and $V_2$ produced by the two amplifiers, ignoring the two potentiometers 34 and 36, will be $K_{A1}(V_{HM} - V_{RHM})$ and $K_{A2}(V_{SP} - V_{RSP})$, respectively, where $K_{A1}$ and $K_{A2}$ equal the differential gains of amplifiers A1 and A2, also respectively. These signals are applied via the resistance network comprising resistors R1, R2, and R3, to the operational amplifier A3 to produce a voltage at the amplifier output terminal 70 that varies according to the difference between the two components of the feedback signal $V_H$ and the two reference correction signals $V_{RSP}$ and $V_{RHM}$. It therefore follows that, if the output terminal 70 of the operational amplifier A3 is connected to the point 20, the voltage $V_3$, and therefore the amplitude and average peak value of the current $i_L$ through the inductance $L_X$, will be caused to follow precisely the waveforms of the two reference signals. The resultant voltage $V_S$ is shown as the third waveform of FIG. 4.

Operation of the circuit of FIG. 3 with the point 20 reconnected as indicated is best understood with reference to the remaining waveforms of FIG. 4. The waveform labeled $V_{T1}$ is the feedback voltage signal developed within the secondary winding 62 of the sensing transformer T1 and used as the input to the rectifier/detector 40. This signal comprises a sawtooth voltage corresponding to the current $i_L$ that alternates at the horizontal deflection rate while its amplitude is modulated at the vertical rate. For clarity, only the envelope 80 defined by the peak values of the signal is shown in FIG. 4. After rectification and peak detection, the signal $V_{T1}$ is transformed into the signal $V_H$, also shown in FIG. 4. As will be apparent to those persons skilled in the art, the signal $V_H$ defines the positive envelope of the signal $V_{T1}$ and includes an AC component varying at the vertical deflection rate and a non-varying DC component. The configuration of these two components matches substantially the configuration of the two reference signals $V_{RSP}$ and $V_{RHM}$ described earlier. Thus, under ideal conditions, the signal $V_{SP}$ present at the positive input terminal 44 of the difference amplifier A2, and representing the amplitude of the deflection current $i_L$, will match substantially the side pincushion reference signal $V_{RSP}$ present at the negative input terminal 35. Similarly, the signal $V_{HM}$ present at the positive input terminal 48 of the difference amplifier A1 and representing the average value of the positive envelope of the deflection current, will match substantially the picture width reference signal $V_{RHM}$ present at the negative input terminal 37. This forced conformance of the two components $V_{SP}$ and $V_{HM}$ of the feedback signal $V_H$ with the two reference signals $V_{RSP}$ and $V_{RHM}$ is ensured by the closed loop control of the voltage $V_3$ at point 20 by the amplifier A3 in response to the two difference signals $V_1$ and $V_2$.

It should be noted that the feedback signal $V_{T1}$ is a function of the current $i_L$ through the inductance $L_X$ only and not also a function of the voltage across the capacitor $C_{RT}$. This is important for the maintenance of picture width independent of changes in the video line rate. As is known to the art, the peak voltage developed across the capacitor $C_{RT}$ is slightly greater than $i_{p}$-$k\sqrt{L_X/C_{RT}}+V_3$. Absent pincushion correction and line rate variations, the capacitor voltage, or a voltage that is a function of the capacitor voltage, could be used as the feedback signal to regulate picture width. Such a scheme is the subject of the Infante reference cited earlier. However, in the circuit of the present invention which includes both side pincushion correction and picture width regulation, the voltage $V_3$ is a function of the vertical deflection rate and line rate variation and the use of such a signal as a feedback signal would not provide picture width regulation with the desired line rate independence.

Accordingly, a circuit has been disclosed wherein the current through the yoke inductance of a cathode-ray tube electromagnetic deflection system is caused simultaneously to follow precisely the configuration of an AC reference signal predistorted to accomplish side pincushion correction and a DC reference signal preselected to accomplish picture width regulation, all independent of changes in the video line rate.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

I claim as my invention:

1. A circuit within a cathode-ray tube electromagnetic deflection system for correcting side pincushion distortion and regulating picture width, said circuit comprising:
   (a) a yoke inductance;
   (b) means including a source of DC supply potential for producing a delfection current through said inductance;
   (c) means for receiving an AC reference signal representing the desired amplitude modulation of said deflection current and a DC reference signal representing the desired average peak value of said deflection current;
   (d) means responsive to said deflection current, said AC reference signal, and said DC reference signal for modulating the magnitude of said DC supply potential so as to cause the amplitude of said deflection current to follow said AC reference signal and the average peak value of said deflection current to follow said DC reference signal.

2. The circuit of claim 1 wherein said means (d) includes means for receiving a first signal representative of the current produced through said inductance and means for transforming said first signal into a second signal having an AC component representative of the amplitude of said deflection current and a DC component representative of the average peak value of said deflection current.

3. The circuit of claim 2 wherein said means (d) further includes means responsive to said AC component of said second signal and said AC reference signal for producing a third signal representative of the difference between the actual amplitude of said deflection current and the desired amplitude of said deflection current, and wherein said means (b) includes means responsive to said third signal for modulating the magnitude of said DC supply potential so as to cause the amplitude of said deflection current to vary in a manner minimizing the magnitude of said third signal.

4. The circuit of claim 2 wherein said means (d) further includes means responsive to said DC component of said second signal and said DC reference signal for producing a third signal representative of the difference between the actual peak value of said deflection current and the desired average peak value of said deflection current, and wherein said means (b) includes means responsive to said third signal for modulating the magnitude of said DC supply potential so as to cause the average peak value of said deflection current to vary in a manner minimizing the magnitude of said third signal.

5. The circuit of claim 2 wherein said means (d) includes a current-sensing transformer connected in series with said inductance for producing said first signal.

6. The circuit of claim 2 wherein said signal-transforming means comprises a full-wave rectifier and a peak detector.

7. A method within a cathode-ray tube electromagnetic deflection system for correcting side pincushion distortion and regulating picture width, said method comprising the steps of:
   (a) providing a yoke inductance within said electromagnetic deflection system;
   (b) producing a deflection current through said inductance, said deflection current being a function, inter alia, of a DC supply potential;
   (c) receiving an AC reference signal representing the desired amplitude of said deflection current;
   (d) receiving a DC reference signal representing the desired average peak value of said deflection current; and
   (e) responsive to said deflection current, said AC reference signal, and said DC reference signal, modulating the magnitude of said DC supply potential so as to cause the amplitude of said deflection current to follow said AC reference signal and the average peak value of said deflection current to follow said DC reference signal.

8. The method of claim 7 wherein said step (e) includes receiving a first signal representative of the current produced through said inductance and transforming said first signal into a second signal having an AC component representative of the amplitude of said deflection current and a DC component representative of the average peak value of said deflection current.

9. The method of claim 8 wherein step (e) further includes, responsive to said AC component of said second signal and said AC reference signal, producing a third signal representative of the difference between the actual amplitude of said deflection current and, responsive to said third signal, modulating the magnitude of said DC supply potential so as to cause the amplitude of said deflection current to vary in a manner minimizing the magnitude of said third signal.

10. The method of claim 8 wherein said step (d) further includes, responsive to said DC component of said second signal and said DC reference signal, producing a third signal representative of the difference between the actual average peak value of said deflection current and the desired average peak value of said deflection current and, responsive to said third signal, modulating the magnitude of said DC supply potential so as to cause the average peak value of said deflection current to vary in a manner minimizing the magnitude of said third signal.

* * * * *